Henry Bullard's Imp't in Syrup Pitcher.

74663

PATENTED
FEB 18 1868

Witnesses.
John H. Shumway
A. J. Tibbits

Henry Bullard
Inventor
By his Attorney
John E. Earle

United States Patent Office.

HENRY BULLARD, OF MIDDLETOWN, CONNECTICUT.

Letters Patent No. 74,663, dated February 18, 1868.

IMPROVED SIRUP-PITCHER.

The Schedule referred to in these Letters Patent and making part of the same.

TO ALL WHOM IT MAY CONCERN:

Be it known that I, HENRY BULLARD, of Middletown, in the county of Middlesex, and State of Connecticut, have invented a new Improvement in Sirup-Pitchers; and I do hereby declare the following, when taken in connection with the accompanying drawings, and the letters of reference marked thereon, to be a full, clear, and exact description of the same, and which said drawings constitute part of this specification, and represent, in—

Figure 1:
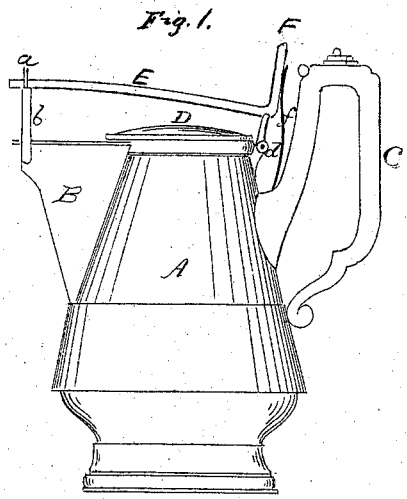

Figure 1, a side view, and in

Figure 2:
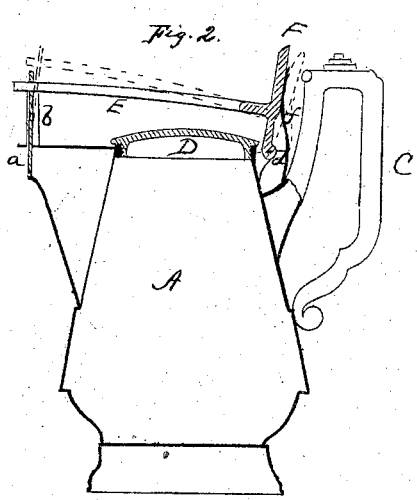

Figure 2 a vertical central section.

This invention relates particularly to an improvement in that class of pitchers employed for pouring sirup, but is alike applicable to pitchers for similar purposes, the object being to construct a cut-off to prevent the drip from the spout of the pitcher. Various devices have been produced to accomplish this object, but none have fully accomplished the desired result. My invention, by which I do obtain the desired result, consists in the arrangement of a slide at the outer extremity of the spout, operated so as to positively cut off and prevent the drip.

In order to the clear understanding of my improvement, as well as to enable others to construct the same, I will proceed to a description thereof as illustrated in the accompanying drawings.

A is the pitcher, B the spout, C, the handle, and D the cover, of common construction. Upon the outer or discharge-end of the spout, I arrange a slide, $a$, in proper guides, $b$, so that the said slide will move freely up and down, across, and so as to close the opening of the spout. The best means which I have yet devised for operating the said slide is by a lever, E, pivoted at $d$, and carried back to within such relative position to the handle C that the thumb of the hand grasping the handle may be extended and placed upon the end, F, of the said lever, so as to raise the lever to the position denoted in blue, fig. 2, thus raising the slide and opening the spout, and when released from the depression of the thumb, a spring, $f$, or its equivalent, forces the slide down and perfectly closes the opening of the spout. The operation of the slide, thus arranged, will be readily understood by reference to the drawings.

In the drawing I have shown the slide as operating vertically to close the spout. The position of the slide must, of course, be adapted to the peculiar form of the spout, and such adaptation those skilled in this class of manufactures will readily perceive.

Having thus fully described my invention, what I claim as new and useful, and desire to secure by Letters Patent, is—

The arrangement of the slide or cut-off $a$ upon the spout B, independent of the cover, and in combination with a lever and spring, as a means of operating the said slide, substantially as herein set forth.

HENRY BULLARD.

Witnesses:
ELMORE PENFIELD,
G. H. HULBERT.